and
Patented Jan. 31, 1956

2,733,252

SALTS OF FATTY ACID ESTERS OF LACTYLIC ACIDS

Jerome B. Thompson and Bruce D. Buddemeyer, Kansas City, Mo., assignors to C. J. Patterson Company, a corporation of Missouri No Drawing. Application February 23, 1954,
Serial No. 412,048

17 Claims. (Cl. 260—410.9)

The present invention relates to a process for preparing the fatty acid esters of lactylic acid and the salts thereof. More specifically, it relates to an improved method for the commercial production of salts of ester acids having the general structural formula:

$$RCO(OCHCH_3CO)_xOY$$

wherein RCO is the radical of one of the high boiling acylic acids, or fatty acids, $x$ is the number of lactyl groups averaging 1 to 4, inclusive, and Y is a cation. These compounds, as a class, may be referred to as acyl or fatty acid lactylates.

The fatty acid lactylates have been found most useful compounds because of their notable effects upon the colloidal properties of proteins. Their properties are such that they would be most useful as plasticizers, emulsifiers, biologically active agents, and for a number of other purposes, were they made available economically and in quantity.

An object of the present invention is to provide a commercially feasible process whereby they may be produced in quantity.

A further object is to provide a process for producing these useful compounds which is simpler and gives better yields than has heretofore been possible.

The present invention permits the realization of these objects by providing a process which takes advantage of the known tendencies of lactic acid to form condensation products with carboxylic acids and itself but limits the numbers of products and increases the yield of the more economical and useful lower molecular weight compounds. The limiting effect is accomplished by adding to a reaction mixture of fatty acid and lactylic acid, an alkali or alkaline earth oxide or hydroxide or salts of such cationic types with weak and volatile acids such as carbonic acid in more than catalytic amounts.

The original procedure for making the compounds of the class was to react the proper acyl chloride with lactic acid which had been polymerized to a certain average polylactylic acid and subsequently to neutralize the resulting ester acid to obtain the desired salt. As described in our copending application Serial No. 261,382, filed December 12, 1951, good yields of functional products were obtained but it was found that the process possessed numerous objectionable features when attempts were made to expand it to commercial size reactors.

This process required four major operational steps to make the desired acyl lactylates from the starting materials. It was necessary to remove as much water as possible from the lactic acid; practically, this meant a rather high average degree of polymerization. It was necessary to make the required acyl chloride from the fatty acid. Due to the corrosive nature of the acid chlorides and the HCl produced, it was necessary to employ special glass lined reactors and condensers in their preparation and during their reaction with the polylactylic acid. After the reaction it was necessary to neutralize the product to get the more versatile desired salts. The process was long, tedious, and not readily adaptable to commercial production.

Functional acyl lactylate compounds can be prepared by placing the fatty acid and the lactic acid or lactylic acid together and heating to promote reaction and remove water. The product of this standard direct esterification was found to contain a very wide variety of compounds due to the tendency of lactic acid to react with itself. Yields of desirable components from these syntheses were no better than 40–50% and functionality was of like order. The use of typical acidic esterification catalysts such as Twitchel reagents, sulfuric acid, phosphoric acid, hydrogen chloride, zinc chloride, ferric chloride, stannous and stannic chloride, was tried and proven to be of little value; the yields were uniformly poor. The catalysts seemed to promote the formation of dark products with objectionable odor and the removal of these and the catalysts from the products presented a further problem. After the reactions and purifications it was still necessary to neutralize to get the desired salt.

The process of the present invention is not as lengthy as the acyl chloride procedure previously employed and also provides much better yields of acyl lactylate salts than does the direct esterification process. It is novel in that its purposes are furthered by the presence of considerable amounts of basic materials which are generally foreign to and unfavorable for esterification reactions.

The acid chloride process described has been found to give good yields of fatty acid lactylates in which the average number of lactyl groups can range from one to ten. The present process is more limited in that its advantages over the standard direct synthesis described are not fully realized if the desired product is to have an average of more than about four lactyl groups per molecule. The present process is most advantageous when employed for the production of such lactylates in which the average number of lactyl groups is between about 1 and 3. For the known uses of the acyl lactylates these are, fortunately, the preferred products.

The present process is distinctly different from these usual esterifications processes in that the fatty acids and lactylic acids are caused to react to an almost quantitative extent by heating them together in the presence of more than catalytic quantities of basic metallic ions. In general the acyl lactylic acids and salts are produced by the instant process by heating 1.0 equivalent of a fatty acid with about 1.2 equivalents of lactic acid as monomer for each lactyl group desired in the presence of 0.1 to 1.5 equivalents of alkali metal or alkaline earth ions. In other words, in the preparation of acyl lactylic acids and their salts containing from 1 to 4 lactylic groups 1.2 to 4.8 equivalents of lactylic acid calculated as lactic acid monomer are required for each equivalent of fatty acid. For example, to prepare calcium stearyl (2) lactylate (in which the number of lactyl groups is about 2), a reactor is charged with 1.0 equivalent of stearic acid, 2.4 equivalents of monomeric lactic acid (or its equivalent in the form of polymerized lactylic acid), and 1.0 equivalent of calcium carbonate. Commercial 85% lactic acid can be employed but the esterification reaction proceeds more rapidly by reacting the fatty acid with dehydrated acids partially polymerized to average equivalent weight of 115 or above by heating the 85% aqueous lactic acid to 100° C. with subsequent removal of by-products by vacuum until the desired degree of polymerization is effected.

When aqueous lactic acid is dehydrated by heating, inter-esterification occurs with loss of water between the carboxyl and alpha alcoholic groups of molecules, and at any time the material will contain monomeric lactic acid, lactyl lactic acid, lactyl lactyl lactic acid, and other polylactylic lactic acids as an equilibrium mixture. The term "lactylic acid" is herein employed to designate all these materials, monomeric as well as polymerized lactic acid with a numerical postscript to indicate average degree of polymerization.

It has been determined, empirically and approximately, that if an acyl lactylate containing a certain average number of lactyl groups is desired, 1.2 equivalents of lactic acid as monomer, based on fatty acid, must be added for each lactyl group. The excess .2 equivalent of lactic acid is partially lost as polylactic acid and other side reactions.

The lactylic acid may be included in its entirety at the beginning of the reaction and this procedure is preferred as it simplifies the process but it will be recognized that it can be introduced in several portions or continuously during the course of the reaction.

The novel condition under which this reaction according to the invention proceeds best, can be produced by use of metal ions such as sodium, potassium, calcium, or barium. Ammonium compounds also have been employed but they cause the formation of a variety of unwanted amides.

These ions can be introduced in the form of their bases or basic reacting compounds such as their hydroxides, oxides, carbonates, or bicarbonates. We prefer to use the carbonates because of ready availability and the absence of water or noxious fumes being formed in the neutralization reaction. Amounts ranging from .1 to 1.5 times the chemical equivalent of fatty acid have been found useful. The preferred range, however, is dependent upon the metal ion. With sodium, for instance, very nearly maximum benefits with regard to yields are obtained at .6 equivalent, and above this level charring occurs more extensively and colored by products of undesirable nature are formed. In the case of calcium the higher levels may be employed with complete satisfaction.

It is obvious that these ions could be introduced as the salts of other volatile acids such as the chlorides as under the conditions of the reaction the required basicity is achieved. This has been found to be possible but undesirable because of the corrosive effects of the fumes resulting.

Reaction temperatures employed vary somewhat and are dependent upon the nature of the fatty acid, the lactylic acid, and the alkali or alkaline earth compound employed and upon their proportions. It has been found that usually a temperature of about 200° C. is satisfactory. Temperatures from 150° C. to 250° C. have been used and have yielded suitable products. The reactions usually proceed to completion in from 1 to 4 hours.

The process is less applicable for making acyl(x) lactylates with the volatile fatty acids; practically, it is best to employ those boiling above 250° C. The higher molecular fatty acids, preferably the saturated ones, containing from 12 to 24 carbon atoms in the molecule, give the best yields of acyl lactylates.

In ordinary chemical engineering practice it is recognized that time and temperatures for reactions are reciprocal functions, within limits. Thus, in the esterification reaction described, increasing temperatures will increase reaction rates or decrease the duration for which the temperature must be maintained. Thus the two are interdependent. It has been found that temperatures of about 200° C. for about 2 hours yield a desirable product in the most economical manner.

It also has been found that the reaction is of increased rate and most vigorous when efficient mechanical agitation of the reaction mixture is undertaken. The fatty acids and lactylic acids form a homogeneous mixture at the reaction temperature but the entry of the metal compound is less complete.

The use of non-oxidizing atmospheres such as carbon dioxide, nitrogen, and illuminating gases as a blanket over the reaction mixture has been found to prevent oxidative side reactions. This is beneficial as it increases yields and minimizes the necessity for further purifications. Since the retorts have exhaust ports to permit water formed in the esterification to escape as steam, naturally a portion of the blanketing gas is lost and must be replaced. This gas flow actually aids the reaction by sweeping this water away.

The properties of the acyl lactylates formed by this process also will depend upon the nature of the fatty acid, the amount of lactic acid, and the kind and amount of alkali or alkaline earth compound employed. In general, the higher the molecular weight of the fatty acid, the higher the melting point. The increase in lactyl groups decreases the melting points slightly. The alkali metal salts of the fatty acid lactylates generally are dispersible in water, while the alkaline earths and the acids are insoluble. Made by this process the products contain varying proportions of the acyl lactylic acids and their salts. If the ester acid alone is desired it may be obtained by acidifying the mixed product with an acid such as muriatic and washing out the chloride salt formed with water; the acyl lactylic acid, being insoluble, is readily separated from the top. Should a completer salt be desired, it can be made by adding the proper amount of alkali or alkaline earth compound just prior to dumping the reactor.

The acyl(x) lactylic acids prepared in this manner are waxy solids. The salts are white or lightly colored solids and are brittle and easily milled to powders.

*Example I*

Ninety-five parts stearic acid, 10.6 parts sodium carbonate, and 71.9 parts lactylic acid, equivalent weight 134, were heated with stirring in an atmosphere and sweep of natural gas at 200° C. for 1.5 hours.

A honey-like liquid was removed from the reactor. The product cooled to a cream colored, brittle solid with a slight caramel odor. It had the following properties:

|  | Salt | Acid (Recovered from Salt) |
|---|---|---|
| Melting Point _____° C__ | 41.4–41.9 | 55.0–55.6 |
| Refractive Index, $n_D^{65°}$ _____ | 1.4413 | 1.4360 |
| pH (2% solution) _____ | 5.90 | _____ |
| Acid Value _____ | _____ | 134.32 |

The above process employs 0.6 equivalent of sodium carbonate for each 1.0 equivalent of stearic acid. The synthesis as described has been executed with amounts of sodium carbonate ranging from 0 to 1.5 equivalents. The salt products obtained were all acidified with hydrogen chloride and the product was washed with water to remove the sodium chloride formed. It was possible then to separate the salt-free stearyl lactylic acid into its components by a method of column chromatography using silicic acid as an adsorbent. The results of these analyses are tabulated below:

| | Eq. Na$_2$CO$_3$ Employed | | | | | | |
|---|---|---|---|---|---|---|---|
| | 1 | 0.02 | 0.10 | 0.30 | 0.60 | 1.00 | 1.50 |
| Stearic Acid_____ | 35.43 | 25.98 | 19.49 | 12.86 | 11.47 | 11.58 | 11.42 |
| Stearyl-1 Lactylic Acid__ | 19.30 | 24.76 | 29.58 | 35.33 | 39.84 | 38.65 | 39.99 |
| Stearyl-2 Lactylic Acid__ | 10.08 | 12.04 | 16.87 | 20.40 | 21.33 | 21.83 | 21.02 |
| Stearyl-3 Lactylic Acid__ | 7.46 | 9.72 | 11.00 | 16.01 | 14.07 | 14.36 | 14.68 |
| Stearyl-4 Lactylic Acid__ | 5.82 | 6.90 | 8.71 | 10.87 | 8.86 | 7.98 | 9.12 |
| Stearyl-5 Lactylic Acid__ | 3.00 | 3.16 | 2.99 | 1.74 | 1.60 | 1.74 | 1.06 |
| Stearyl-6+Lactylic Acids_ | 2.90 | 2.81 | 2.79 | 1.48 | 1.12 | 1.01 | 0.70 |
| Polylactylic Acid_____ | 15.72 | 14.13 | 8.41 | 1.84 | 1.68 | 1.82 | 1.73 |

The product synthesized without sodium carbonate is typical of the standard esterification procedure; only 48% yield of stearyl-(x) lactylic acids was obtained. Some 35% free stearic acid remained in the product and extensive polymerization of the unreacted lactic acid was evident.

By employing 0.02 equivalent of sodium carbonate, reaction equilibrium was shifted toward completion approximately 12%. Catalytic quantities of sodium ion were found relatively ineffective in producing desirable yields of stearyl-(1-4) lactylic acids.

More than catalytic amounts of sodium carbonate increased yields to in excess of 85%. In addition, 0.3 to 1.5 eq. of $Na_2CO_3$ increase the more desirable low molecular weight stearyl lactylic acids having a lactyl moiety between one and four units. For example, the synthesis without the inclusion of sodium carbonate produced but 42.7% of stearyl lactylic acids in the range of one to four lactyl groups per molecule and catalytic quantities of sodium ion increased this value only 10%. Eighty-four per cent of stearyl-(1-4) lactylic acids were obtained in the presence of 0.60 equivalent of sodium carbonate or approximately 100% yield increase. This latter compound had satisfactory color and odor.

In preparing the compound as described above, 0.6 equivalent of sodium carbonate for each one equivalent of stearic acid is preferred. The completely or excessively neutral product has a decided tendency to develop undesirable colors and odors with prolonged heating.

*Example II*

One hundred parts of stearic acid, 34.7 parts of barium carbonate, and 72.2 parts of lactylic acid, equivalent weight 116, were heated with stirring in an atmosphere of carbon dioxide at 200° C. for 110 minutes.

A brittle, light brown solid was obtained with a mild, agreeable odor. Analysis indicated the product to be barium stearyl (1.6) lactylate.

The product melted in the range 43.1–43.3° C., pH of a 2% aqeous solution was 5.31, and the refractive index was 1.4569 at 65° C. The acid recovered from the salt by acidification had the following properties: melting point range 47.2–48.0° C.; refractive index at 65° C. 1.4362; acid value 149.86; and saponification value 382.31.

*Example III*

One hundred parts of stearic acid, 29.1 parts of $K_2CO_3.1½ H_2O$ and 45 parts of commercial 85% lactic acid were heated with stirring in an inert atmosphere of nitrogen at 200° C. for 45 minutes. Forty-five parts additional commercial 85% lactic acid were introduced into the reaction mixture and the process was continued for 30 minutes.

A light tan, brittle solid was formed, possessing a mild caramel odor. Estimation of equivalent weight by free acidity analysis indicates the product to be potassium stearyl-2 lactylate. The compound melted in the range 45.8–46.2° C. and had a refractive index at 65° C. of 1.4455.

*Example IV*

One hundred parts of a hydrogenated fish oil fatty acid having an average carbon chain length of 20, equivalent weight 294.68, 17 parts of calcium carbonate, and 73.3 parts of a lactylic acid of equivalent weight 115.3, were heated with stirring in an atmosphere of nitrogen at 200° C. for 1 hour.

A cream colored, brittle plastic with negligible odor was removed from the reactor. The following constants identified this product as a fish oil fatty acid ester of (17.77) lactylic acid:

| | |
|---|---|
| Acid value | 137.11 |
| Saponification value | 379.70 |
| Melting point (salt) °C | 42.4–43.5 |
| Melting point (acid) °C | 38.0–39.6 |
| Refractive index 65° C. (salt) | 1.4472 |
| Refractive index 65° C. (acid) | 1.4370 |
| pH of 2% solution (salt) | 4.79 |

*Example V*

One hundred parts of stearic acid, 9.0 parts of sodium bicarbonate, and 75.9 parts of lactylic acid, equivalent weight 115.3, were heated with stirring in an atmosphere of carbon dioxide at 175° C. for two hours.

A light cream plastic with negligible odor and taste was formed. This compound melted in the range 51.2–51.7° C. and had an acid value of 140.68.

*Example VI*

One hundred parts of palmitic acid, 10.34 parts of sodium carbonate, and 118.44 parts lactylic acid, equivalent weight 123.12, were heated with agitation in an atmosphere and sweep of illuminating gas at 200° C. for 1.5 hours.

The resultant product was a cream-tan plastic solid. The material was acidified with hydrochloric acid and the recovered palmityl lactiylic acid was characterized. This product had an acid value of 131.18, saponification value of 448.80, melting point range of 37.6–38.8° C., and a refractive index at 65° C. of 1.4360.

We claim:

1. A process for the production of compositions of the general formula

$$RCO(OCHCH_3CO)_xOY$$

wherein RCO is the acyl radical of a fatty acid having a boiling point over 250° C., $x$ is a number indicating the average number of lactyl groups, and Y is a cation which comprises heating a mixture of a fatty acid RCOOH, a lactylic acid compound of the formula $H(OCHCH_3CO)_zOH$ wherein $z$ indicates the average number of lactylic groups in such compound which is not greater than $x$, and a more than catalytic amount of a basicly reacting compound selected from the group consisting of alkali metal and alkaline earth metal basicly reacting compounds.

2. A process according to claim 1 in which said lactylic acid compound is a partially polymerized lactic acid.

3. A process according to claim 1 in which said mixture is heated to a reaction temperature between 150° C. and 250° C.

4. A process according to claim 1 in which said heating is continued until equilibrium is established.

5. A process according to claim 1 in which said mixture is heated under a non-oxidizing atmosphere.

6. A process for the production of compositions of the general formula

$$RCO(OCHCH_3CO)_xOY$$

wherein RCO is the acyl radical of a fatty acid having a boiling point over 250° C., $x$ is a number between 1 and 4 indicating the average number of lactyl groups, and Y is a cation which comprises heating to a temperature between 150° C. and 250° C. a mixture of an essentially non-volatile fatty acid RCOOH, a lactylic acid compound of the formula $H(OCHCH_3CO)_zOH$ wherein $z$ indicates the average number of lactylic groups in such compound which is not greater than $x$, and a more than catalytic amount of a basicly reacting compound selected from the group consisting of alkali metal and alkaline earth metal basicly reacting compounds.

7. A process according to claim 6 in which said mixture is heated to a reaction temperature of about 200° C. and such heating is continued for about 1–4 hours.

8. A process according to claim 6 in which said fatty acid is a straight chained fatty acid containing from 12 to 24 carbon atoms.

9. A process according to claim 6 in which said fatty acid is a straight chained saturated fatty acid containing an even number of carbon atoms of from 16 to 20.

10. A process according to claim 6 in which the quantity of lactylic acid compound in such mixture, calculated as monomeric lactic acid is 1.2 to 4.8 times the number of chemical equivalents of the fatty acid in such mixture.

11. A process according to claim 6 in which the quantity of basicly reacting compound is 0.1 to 1.5 times the number of the chemical equivalents of the fatty acid in such mixture.

12. A process according to claim 6 in which said mixture is heated under an inert gas and an inert gas is passed through the mixture while it is being heated.

13. A process according to claim 6 in which said fatty acid contains 18 carbon atoms, the quantity of lactylic acid compound calculated as monomeric lactic acid is from about 1.2 to 4.8 times and the quantity of basicly reacting compound is 0.1 to 1.5 times the number of chemical equivalents of the fatty acid in such mixture and such mixture is heated to a temperature between about 150° C. to 250° C. for about 1 to 4 hours under an inert atmosphere.

14. A process according to claim 13 in which said basicly reacting compound is sodium carbonate.

15. A process according to claim 13 in which said basicly reacting compound is calcium carbonate.

16. A process according to claim 13 in which said basicly reacting compound is sodium carbonate and the quantity of such sodium carbonate is about equivalent to that of the fatty acid and the quantity of the lactylic acid compound calculated as lactic acid monomer is about 2.4 times the number of chemical equivalents of the fatty acid in such mixture.

17. A process according to claim 13 in which said basicly reacting compound is calcium carbonate and the quantity of such calcium carbonate is about equivalent to that of the fatty acid and the quantity of the lactylic acid compound calculated as lactic acid monomer is about 2.4 times the number of chemical equivalents of the fatty acid in such mixture.

No references cited.